United States Patent
Tahara et al.

(10) Patent No.: US 12,249,930 B2
(45) Date of Patent: Mar. 11, 2025

(54) ELECTROSTATIC TRANSDUCER

(71) Applicant: Sumitomo Riko Company Limited, Aichi (JP)

(72) Inventors: Shinya Tahara, Aichi (JP); Masaki Nasu, Aichi (JP); Katsuhiko Nakano, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 159 days.

(21) Appl. No.: 18/313,362

(22) Filed: May 7, 2023

(65) Prior Publication Data
US 2023/0275529 A1    Aug. 31, 2023

Related U.S. Application Data

(63) Continuation of application No. PCT/JP2021/013819, filed on Mar. 31, 2021.

(30) Foreign Application Priority Data

Nov. 30, 2020    (JP) .................. 2020-198693

(51) Int. Cl.
*H02N 1/00* (2006.01)
*B06B 1/02* (2006.01)
(Continued)

(52) U.S. Cl.
CPC .................. *H02N 1/002* (2013.01)

(58) Field of Classification Search
CPC .......... H01G 5/01; H01G 5/011; H01G 4/228; H02N 1/002; H04R 19/00; H04R 1/06; B06B 1/0292
See application file for complete search history.

(56) References Cited

U.S. PATENT DOCUMENTS 7,548,015 B2 *   6/2009  Benslimane ........... H10N 30/50
                                                        310/365
8,740,800 B2 *   6/2014  Wakabayashi ........ B06B 1/0292
                                                        600/459
(Continued)

FOREIGN PATENT DOCUMENTS

EP           4002868          5/2022
JP         2009021549          1/2009
(Continued)

OTHER PUBLICATIONS

"Written Opinion of the International Searching Authority (Form PCT/ISA/237) of PCT/JP2021/013819", mailed on May 11, 2021, with English translation thereof, pp. 1-8.
(Continued)

*Primary Examiner* — Burton S Mullins
(74) *Attorney, Agent, or Firm* — JCIPRNET

(57) ABSTRACT

An electrostatic transducer (1) includes: an insulator sheet (11); a first electrode sheet (12); a lead (30); a first bonding part (61), electrically bonding the first electrode sheet (12) with a core wire (30a) of the lead (30) in a first area (Pa) where the first electrode sheet (12) and the core wire (30a) of the lead (30) are disposed overlapping each other; and a second bonding part (62), bonding the insulator sheet (11) with a coating (30b) of the lead (30) in a second area (Pb) where the insulator sheet (11) and the coating (30b) of the lead (30) are disposed overlapping each other.

27 Claims, 5 Drawing Sheets

(51) Int. Cl.
*H04R 1/06* (2006.01)
*H04R 19/00* (2006.01)

(56) References Cited

U.S. PATENT DOCUMENTS

| | | | |
|---|---|---|---|
| 9,409,719 B2 * | 8/2016 | Sube | B65G 27/24 |
| 10,653,306 B2 | 5/2020 | Kimura | |
| 10,792,704 B2 * | 10/2020 | Nakano | B06B 1/0292 |
| 11,486,421 B2 * | 11/2022 | Keplinger | F15B 15/10 |
| 2019/0181327 A1 * | 6/2019 | Nakano | H04R 19/04 |
| 2019/0216304 A1 | 7/2019 | Kimura | |
| 2019/0380606 A1 * | 12/2019 | Yoshida | A61B 5/291 |
| 2020/0053482 A1 | 2/2020 | Nakano et al. | |
| 2020/0213772 A1 | 7/2020 | Hasegawa et al. | |
| 2020/0307992 A1 | 10/2020 | Hasegawa et al. | |
| 2021/0291229 A1 | 9/2021 | Hasegawa et al. | |
| 2021/0331203 A1 | 10/2021 | Nakano et al. | |

FOREIGN PATENT DOCUMENTS

| | | |
|---|---|---|
| JP | 4844848 | 12/2011 |
| JP | 6464321 | 2/2019 |
| JP | 6511271 | 5/2019 |
| WO | 2021038761 | 3/2021 |

OTHER PUBLICATIONS

"International Search Report (Form PCT/ISA/210) of PCT/JP2021/013819", mailed on May 11, 2021, with English translation thereof, pp. 1-5.

* cited by examiner

ELECTROSTATIC TRANSDUCER

CROSS-REFERENCE TO RELATED APPLICATION

This application is a continuation of PCT International Application No. PCT/JP2021/013819, filed on Mar. 31, 2021, which claims priority under 35 U.S.C § 119(a) to Japanese Patent Application No. 2020-198693, filed on Nov. 30, 2020. Each of the above application(s) is hereby expressly incorporated by reference, in its entirety, into the present application.

BACKGROUND

Technical Field

The disclosure relates to an electrostatic transducer.

Related Art

Japanese Patent No. 6511271 describes that a core wire of a lead (having the same meaning as a conducting wire) is exposed, the core wire is connected to an electrode pad on a substrate by ultrasonic bonding, and the lead is fixed to the substrate by a fixing resin. Japanese Patent No. 6464321 describes that an exposed core wire is connected to a connection land via a metal tube by ultrasonic bonding. Japanese Patent No. 4844848 describes that a core wire of a lead and a terminal electrode are bonded by ultrasonic bonding without peeling off an insulating coating of a terminal of the lead. In Japanese Patent Laid-open No. 2009-21549, a spiral flat coil is formed on a surface of a thermoplastic film. The flat coil is formed by fusing a lead (conducting wire) coated with a thermoplastic resin to the surface of the film so as to swirl in substantially the same direction and have substantially the same shape.

To prevent a lead with a tip attached to an electrode sheet from being pulled out and peeled off from the electrode sheet in an axial direction of the lead is important from the viewpoint of reliability of a connection state. In particular, if the electrode sheet is soft, the lead is likely to be pulled out or peeled off. Further, it is desired that the electrode sheet and the lead be connected easily and at low cost.

SUMMARY

One aspect of the disclosure is an electrostatic transducer, including: an insulator sheet; a first electrode sheet, disposed on a first surface of the insulator sheet; a lead, including a core wire and a coating formed of a thermoplastic material and coating the core wire, the lead having a portion disposed overlapping the first surface of the insulator sheet and a portion disposed overlapping the first electrode sheet; a first bonding part, electrically bonding the first electrode sheet with the core wire of the lead in a first area in a plane direction of the insulator sheet, wherein the first electrode sheet and the core wire of the lead are disposed overlapping each other in the first area; and a second bonding part, bonding the insulator sheet with the coating of the lead in a second area in the plane direction of the insulator sheet that is different from the first area, wherein the insulator sheet and the coating of the lead are disposed overlapping each other in the second area.

DESCRIPTION OF THE EMBODIMENTS

Figure 1:
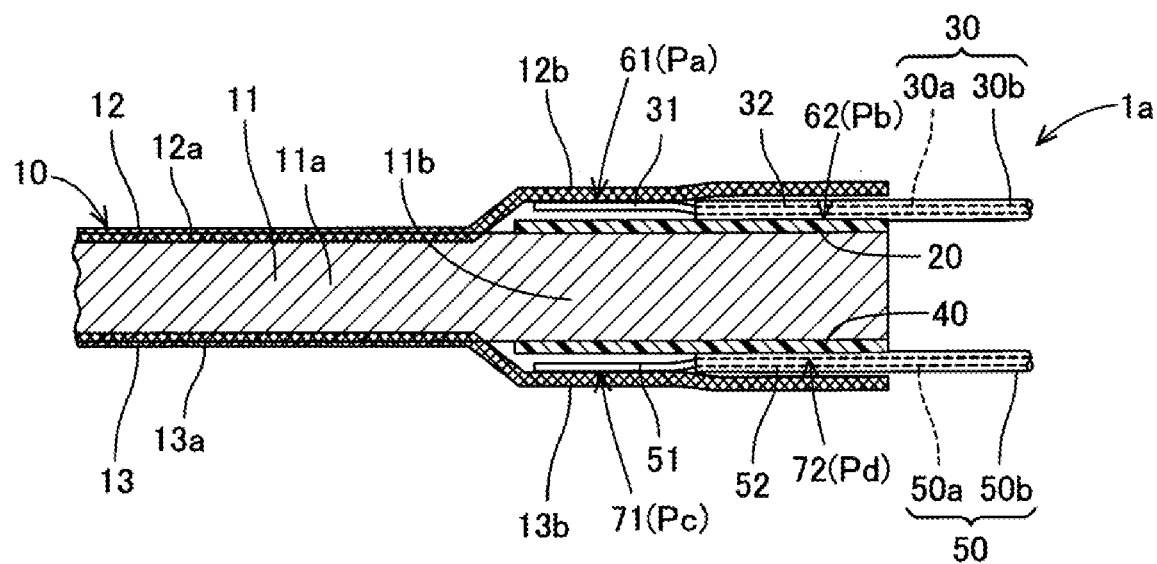
FIG. 1 is a cross-sectional view of an electrostatic transducer of a first example.

The disclosure provides an electrostatic transducer in which a core wire of a lead can be reliably electrically bonded to an electrode sheet and pull-out resistance of the lead can be increased.

According to one aspect of the disclosure, an electrostatic transducer includes: an insulator sheet; a first electrode sheet, disposed on a first surface of the insulator sheet; a lead, including a core wire and a coating formed of a thermoplastic material and coating the core wire, the lead having a portion disposed overlapping the first surface of the insulator sheet and a portion disposed overlapping the first electrode sheet; a first bonding part, electrically bonding the first electrode sheet with the core wire of the lead in a first area in a plane direction of the insulator sheet, wherein the first electrode sheet and the core wire of the lead are disposed overlapping each other in the first area; and a second bonding part, bonding the insulator sheet with the coating of the lead in a second area in the plane direction of the insulator sheet that is different from the first area, wherein the insulator sheet and the coating of the lead are disposed overlapping each other in the second area.

According to the above electrostatic transducer, while the first bonding part in the first area electrically bonds the first electrode sheet with the core wire of the lead, the second bonding part in the second area bonds the insulator sheet with the coating of the lead. That is, pull-out resistance of the lead mainly functions in the second bonding part in the second area. In this way, by setting a portion where the first electrode sheet and the core wire of the lead are electrically bonded and a portion where the pull-out resistance of the lead is secured as separate portions, electrical bonding and pull-out resistance can both be achieved. Accordingly, the core wire of the lead can be reliably electrically bonded to the first electrode sheet, and the pull-out resistance of the lead can be increased.

1. Application Target

An electrostatic transducer (hereinafter referred to as "transducer") includes, for example, a substrate, and an electrostatic sheet attached to an attachment surface of the substrate. The substrate is an arbitrary member and is formed of metal, resin, or other material.

The attachment surface of the substrate may be formed in a three-dimensional shape such as a curved surface, a composite plane (a shape formed by a plurality of planes), or a composite shape of a plane and a curved surface, or a surface of the substrate may be formed in a single plane shape. In the case where the substrate is formed of a material having flexibility, the electrostatic sheet can also be attached to the attachment surface of the substrate. The transducer may include no substrate and the electrostatic sheet may be used alone.

The electrostatic sheet is disposed on the attachment surface (surface) of the substrate. The electrostatic sheet is soft as a whole. "Soft" means having flexibility and being extendable in a plane direction. Accordingly, even if the attachment surface of the substrate has a three-dimensional shape, the electrostatic sheet can be attached along the attachment surface of the substrate. In particular, by attaching the electrostatic sheet to the attachment surface of the substrate while extending the electrostatic sheet in the plane direction, the occurrence of wrinkles on the electrostatic sheet can be suppressed.

The electrostatic sheet is able to function as an actuator or a sensor by utilizing a change in capacitance between a pair of electrodes. The electrostatic sheet may include at least one of a pair of electrodes, and is not limited to a configuration including a pair of electrodes. Of course, the electrostatic sheet may include a pair of electrodes. In the electrostatic sheet, the electrode on a back surface side is able to function as a shield electrode.

The electrostatic sheet is able to function as an actuator that generates vibration or sound or the like by utilizing a change in capacitance between electrodes. The electrostatic sheet is able to function as a sensor that detects a pushing force from the outside or a sensor that detects contact or approach of a conductor having an electric potential by utilizing a change in capacitance between electrodes.

If the electrostatic sheet functions as an actuator, by application of a voltage to an electrode, an insulator is deformed according to an electric potential between the electrodes, and vibration is generated as the insulator is deformed. If the electrostatic sheet functions as a sensor that detects a pushing force, the capacitance between the electrodes changes due to deformation of an insulator caused by input of a pushing force, vibration, sound or the like from the outside (hereinafter referred to as pushing force or the like from the outside), and by detecting a voltage according to the capacitance between the electrodes, the pushing force or the like from the outside is detected. If the electrostatic sheet functions as a sensor that detects contact or approach, the capacitance between the electrodes changes due to contact or approach of a conductor having an electric potential, and by detecting a voltage according to the changed capacitance between the electrodes, the contact or approach of the conductor is detected.

The transducer is applicable to, for example, a surface of a mouse or a joystick being a pointing device, or a surface of a vehicle part. Examples of the vehicle part include an armrest, a doorknob, a shift lever, a steering wheel, a door trim, a center trim, a center console, and a ceiling. In many cases, the substrate is formed of a material having no flexibility, such as metal or hard resin. The transducer is able to detect a state of a target or apply vibration or the like to the target.

The transducer may be disposed on a surface layer side of a sheet bearing surface or a surface layer side of a backrest surface. In this case, the transducer may be configured so that an electrostatic sheet is attached to a substrate formed of a material having flexibility, such as a resin film. The transducer may include no substrate and be composed of an electrostatic sheet alone.

The electrostatic sheet of the transducer may also be configured to have a function of a heater. In this case, the transducer is able to apply heat to the target in addition to detecting the state of the target and applying vibration to the target.

2. Transducer 1a of First Example

A transducer 1a of a first example is described with reference to FIG. 1 and FIG. 2. The transducer 1a includes an electrostatic sheet 10. The electrostatic sheet 10 may be disposed on a surface of a substrate (not shown), or may be used alone.

The electrostatic sheet 10 includes an insulator sheet 11 and a first electrode sheet 12. In FIG. 1, a case where the electrostatic sheet 10 further includes a second electrode sheet 13 is described as an example. However, the electrostatic sheet 10 may also be configured not to include the second electrostatic sheet 13. For example, if the substrate constitutes an electrode, the second electrode sheet 13 may be unnecessary.

The insulator sheet 11 includes a body area 11a and a terminal area 11b. The body area 11a is an area used as an actuator or a sensor or the like. The terminal area 11b is an area for connecting electric power and electric signals between the body area 11a and the outside.

The insulator sheet 11 is formed of, for example, an elastomer. Accordingly, the insulator sheet 11 is soft. That is, the insulator sheet 11 has flexibility and is extendable in the plane direction. The insulator sheet 11 is formed of, for example, a thermoplastic material, in particular a thermoplastic elastomer. The insulator sheet 11 may be formed of a thermoplastic elastomer itself, or may be formed of a crosslinked elastomer obtained by heating a thermoplastic elastomer as a material.

The insulator sheet 11 may contain a rubber other than the thermoplastic elastomer and a resin. For example, if a rubber such as ethylene-propylene rubber (EPM, EPDM) is contained, softness of the insulator sheet 11 is improved. From the viewpoint of improving the softness of the insulator sheet 11, the insulator sheet 11 may contain a softness-imparting component such as a plasticizer.

The first insulator sheet 12 is disposed on a first surface of the insulator sheet 11, that is, a front surface (upper surface in FIG. 1) side of the insulator sheet 11. The first electrode sheet 12 includes a first electrode body 12a disposed in the body area 11a of the insulator sheet 11 and a first electrode terminal 12b disposed in the terminal area 11b of the insulator sheet 11.

The first electrode sheet 12 has conductivity. Further, the first electrode sheet 12 is soft. That is, the first electrode sheet 12 has flexibility and is extendable in the plane direction. The first electrode sheet 12 is formed of, for example, a conductive cloth, a conductive elastomer, or a metal foil. FIG. 1 illustrates a case where the first electrode sheet 12 is a conductive cloth.

The case where the first electrode sheet 12 is formed of a conductive cloth is described in detail. Conductive cloth is woven fabric or non-woven fabric formed of a conductive fiber. Here, the conductive fiber is formed by coating a surface of a fiber having softness with a conductive material. The conductive fiber is, for example, formed by plating a surface of a resin fiber such as polyethylene with copper or nickel.

In this case, the first electrode sheet 12 is fixed to the insulator sheet 11 by fusion (heat fusion) of the insulator sheet 11 itself. Since the first electrode sheet 12 is a cloth, it has a plurality of through holes. Accordingly, a portion of the insulator sheet 11 enters the through holes of the first insulator sheet 12. That is, at least a part of the first insulator sheet 12 is buried in the insulator sheet 11.

The case where the first electrode sheet 12 is formed of a conductive elastomer is described in detail. In this case, the first electrode sheet 12 is formed of an elastomer containing a conductive filler. That is, the first electrode sheet 12 is formed by containing a conductive filler in an elastomer used as a base material. The elastomer used in the first electrode sheet 12 may be formed of a material of the same kind as a main component of the insulator sheet 11. In particular, the first electrode sheet 12 may be formed of a thermoplastic elastomer.

However, the first electrode sheet 12 is formed of a material having a softening point higher than that of the insulator sheet 11. The reason is to enable the insulator sheet 11 to soften earlier than the first electrode sheet 12 when the first electrode sheet 12 is fixed to the insulator sheet 11 by fusion (heat fusion) of the insulator sheet 11 itself.

Here, the first electrode sheet 12 is fixed to the insulator sheet 11 by fusion (heat fusion) of the insulator sheet 11 itself. Furthermore, if the first electrode sheet 12 is formed of an elastomer, by fusion (heat fusion) of the first electrode sheet 12 itself, the first electrode sheet 12 and the insulator sheet 11 are fixed. That is, the first electrode sheet 12 and the insulator sheet 11 are fixed by mutual fusion. The first electrode sheet 12 and the insulator sheet 11 may be fixed by fusion of only one of them.

The case where the first electrode sheet 12 is formed of a metal foil is described in detail. Like the conductive cloth, the metal foil preferably has a plurality of through holes. Accordingly, the first electrode sheet 12 has flexibility and is able to extend in the plane direction as the through holes are deformed. The metal foil may be any metal material that is conductive. For example, a copper foil or an aluminum foil can be used. Further, as in the case of the conductive cloth, the first electrode sheet 12 is fixed to the insulator sheet 11 by fusion (heat fusion) of the insulator sheet 11 itself.

The second electrode sheet 13 is disposed on a second surface of the insulator sheet 11, that is, a back surface (lower surface in FIG. 1) side of the insulator sheet 11. If the transducer 1a includes a substrate, the second electrode sheet 13 is disposed between the insulator sheet 11 and the substrate. The second electrode sheet 13 includes a second electrode body 13a disposed in the body area 11a of the insulator sheet 11 and a second electrode terminal 13b disposed in the terminal area 11b of the insulator sheet 11.

Figure 2:
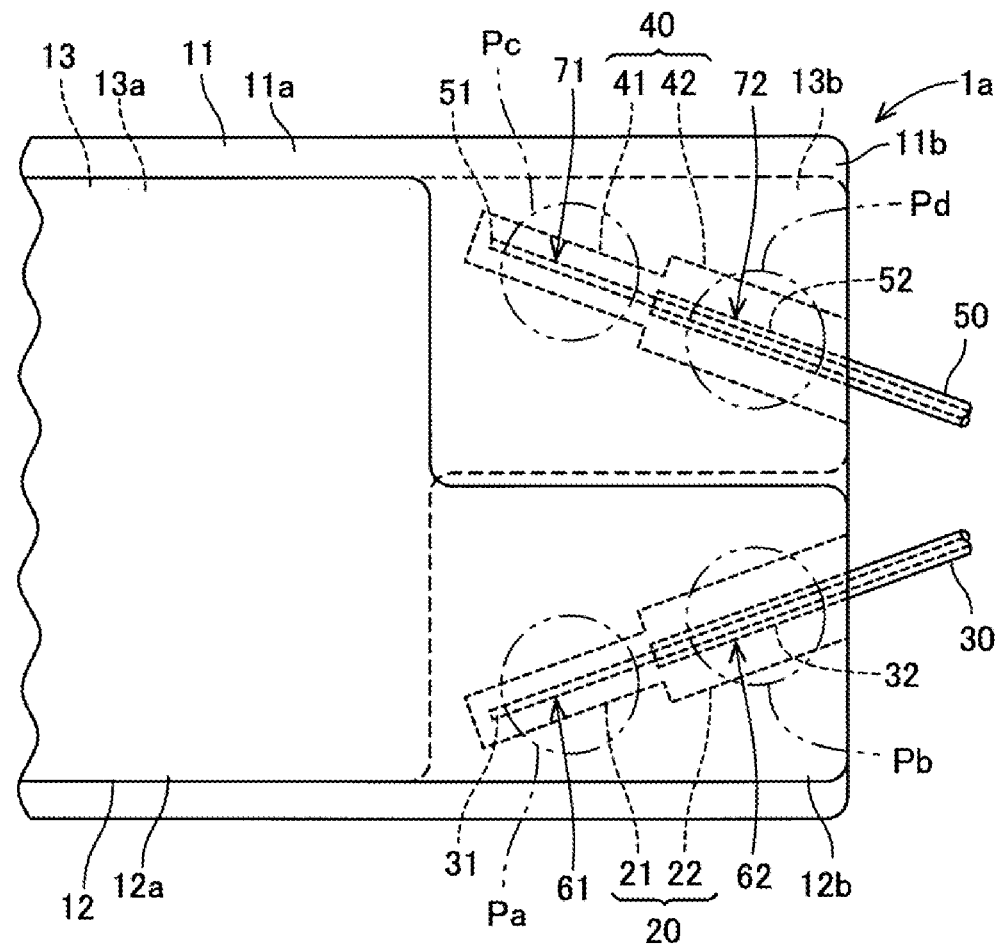
FIG. 2 is a plan view of the electrostatic transducer of the first example.

Here, as shown in FIG. 2, the second electrode body 13a is disposed so as to face almost the entire surface of the first electrode body 12a of the first electrode sheet 12. On the other hand, the second electrode terminal 13b of the second electrode sheet 13 is disposed in a deviated position without facing the first electrode terminal 12b of the first electrode sheet 12. The reason is to reduce the thickness of the transducer 1a due to the presence of leads 30 and 50 to be described later. However, the first electrode terminal 12b and the second electrode terminal 13b may be disposed so as to face each other.

The second electrode sheet 13 is formed in the same manner as the first electrode sheet 12. That is, the second electrode sheet 13 is soft and is formed of a conductive cloth, a conductive elastomer, a metal foil or the like.

The transducer 1a includes a first bonding restricting layer 20, a first lead 30, a second bonding restricting layer 40, and a second lead 50. However, in the configuration where the transducer 1a does not include the second electrode sheet 13, the transducer 1a is configured not to include the second bonding restricting layer 40 and the second lead 50.

The first bonding restricting layer 20 is disposed between the terminal area 11b of the insulator sheet 11 and the first electrode terminal 12b of the first electrode sheet 12 and restricts the bonding between the insulator sheet 11 and the first electrode sheet 12. Accordingly, in the first electrode terminal 12b of the first electrode sheet 12, in an area where the first bonding restricting layer 20 is present, a space is formed between the first electrode terminal 12b and the first bonding restricting layer 20. On the other hand, in the first electrode terminal 12b of the first electrode sheet 12, in an area where the first bonding restricting layer 20 is not present, the first electrode terminal 12b is bonded to the insulator sheet 11.

The first bonding restricting layer 20 is bonded to the insulator sheet 11 by fusion of the insulator sheet 11 itself. Accordingly, the first bonding restricting layer 20 is formed of, for example, a material having a softening point higher than that of the insulator sheet 11. For example, a resin sheet formed of a thermoplastic material can be applied in the first bonding restricting layer 20.

As shown in FIG. 2, the first bonding restricting layer 20 is formed in an elongated shape. One end of the first bonding restricting layer 20 in a lengthwise direction is disposed on an end side of the first electrode terminal 12b of the first electrode sheet 12. The other end of the first bonding restricting layer 20 in the lengthwise direction is disposed so as to extend from the end side of the first electrode terminal 12b of the first electrode sheet 12 toward the first electrode body 12a of the first electrode sheet 12. In the present example, the other end of the first bonding restricting layer 20 in the lengthwise direction is disposed so as to extend in a direction (in particular, an oblique direction) intersecting the end side of the first electrode sheet 12.

The first bonding restricting layer 20 includes an inner part 21 formed to be narrow and an edge 22 formed to be wide. In FIG. 2, the inner part 21 is formed to have the same width over the entire length, and the edge 22 is also formed to have the same width over the entire length. In addition, the width may be gradually reduced from a base end of the edge 22 (end side of the first electrode sheet 12) toward a tip of the inner part 21.

The first lead 30 includes a core wire 30a and a coating 30b that insulatingly coats an outer peripheral surface of the core wire 30a. The core wire 30a is formed of, for example, a copper wire. The coating 30b is formed of a thermoplastic material. The coating 30b may be any thermoplastic material having an insulating property, and is formed of, for example, a material applicable to the insulator sheet 11 described above.

A part of the first lead 30 is disposed in the terminal area 11b in the first surface (upper surface of FIG. 1) of the insulator sheet 11. In the transducer 1a of the first example, since a part of the first lead 30 is disposed in an area where the insulator sheet 11 and the first electrode sheet 12 are both present, the part of the first lead 30 is disposed overlapping the first surface of the insulator sheet 11 and also overlapping the first electrode sheet 12.

If the first electrode sheet 12 has an area disposed not overlapping a part of the insulator sheet 11, the first lead 30 may have a portion disposed overlapping only the insulator sheet 11 and a portion disposed overlapping the insulator sheet 11 and the first electrode sheet 12. In this case, the first lead 30 has a portion disposed overlapping at least the first surface of the insulator sheet 11 and a portion disposed overlapping the first electrode sheet 12.

In the present example, the first lead 30 is disposed between the insulator sheet 11 and the first electrode sheet 12. In particular, since the first bonding restricting layer 20 is disposed on the insulator sheet 11, the first lead 30 is disposed between the first bonding restricting layer 20 and the first electrode sheet 12.

The first lead 30 includes, on a tip side of the first lead 30, an exposed core wire part 31 from which the coating 30b has been removed and the core wire 30a is exposed. The first lead 30 includes a coated core wire part 32 from which the coating 30b has not been removed.

The exposed core wire part 31 may be configured as follows. The exposed core wire part 31 is configured so that a metal plating layer is formed on the core wire 30a formed of a copper wire. In this case, nickel plating is suitable for the metal plating layer. The exposed core wire part 31 may be configured so that a solder flow layer is formed on the core wire 30a. The metal plating layer and the solder flow layer act to improve conduction with the first electrode sheet 12.

The exposed core wire part 31 of the first lead 30 is disposed in the inner part 21 of the first bonding restricting layer 20, and the coated core wire part 32 is disposed in the edge 22 of the first bonding restricting layer 20. The first lead 30 extends outward from the edge 22 of the first bonding restricting layer 20.

Here, the first lead 30 is disposed in a position by being inserted into the space formed between the first bonding restricting layer 20 and the first electrode sheet 12. The first bonding restricting layer 20 has a large width in the edge 22 and a small width in the inner part 21. Accordingly, when the first lead 30 is inserted, the large width of the edge 22 facilitates initial insertion, and the small width of the inner part 21 allows the first lead 30 to be positioned in a desired position.

Further, in the transducer 1a, in a first area Pa (shown in FIG. 2) where the first electrode sheet 12 and the exposed core wire part 31 of the first lead 30 are disposed adjacent to and overlapping each other in an area in the plane direction of the insulator sheet 11, a first bonding part 61 (shown in FIG. 1) that electrically bonds the first electrode sheet 12 with the exposed core wire part 31 of the first lead 30 is provided.

In the present example, in the first area Pa, the first electrode sheet 12 and the core wire 30a portion in the exposed core wire part 31 are electrically bonded via the metal plating layer or the solder flow layer. That is, the first bonding part 61 is composed of a part of the metal plating layer or a part of the solder flow layer. In particular, when the first bonding part 61 is composed of a part of the solder flow layer, the first electrode sheet 12 and the core wire 30a portion in the exposed core wire part 31 can be electrically bonded surface-to-surface, and conduction can be improved.

Here, a part of the first bonding restricting layer 20 is disposed in the first area Pa. Accordingly, after the first lead 30 has been inserted between the first electrode sheet 12 and the first bonding restricting layer 20, by subjecting the first area Pa to ultrasonic welding, the first electrode sheet 12 and the exposed core wire part 31 of the first lead 30 are electrically bonded. The first electrode sheet 12 and the first lead 30 are bonded by ultrasonic welding since they have metal on their surfaces. On the other hand, although the first lead 30 and the first bonding restricting layer 20 are adjacent to each other, since they are formed of metal and resin, they are not welded even if being subjected to ultrasonic welding.

In the transducer 1a, in a second area Pb (shown in FIG. 2) where the insulator sheet 11 and the coated core wire part 32 of the first lead 30 are disposed overlapping each other in the area in the plane direction of the insulator sheet 11, a second bonding part 62 (shown in FIG. 1) that bonds the insulator sheet 11 with the coated core wire part 32 of the first lead 30 is provided. The second bonding part 62 is an area different from the first bonding part 61.

In the present example, a part of the first bonding restricting layer 20 is disposed in the second area Pb. In the second area Pb, the part of the first bonding restricting layer 20 is disposed between the insulator sheet 11 and the coated core wire part 32 of the first lead 30. Accordingly, in the second area Pb, the insulator sheet 11 and the first bonding restricting layer 20 are bonded, and the first bonding restricting layer 20 and the coated core wire part 32 of the first lead 30 are bonded. That is, the second bonding part 62 is composed of a part of the insulator sheet 11, a part of the first bonding restricting layer 20, and a part of the coated core wire part 32. In this way, the second bonding part 62 indirectly bonds the insulator sheet 11 with the coated core wire part 32 via the first bonding restricting layer 20.

After the first lead 30 has been inserted between the first electrode sheet 12 and the first bonding restricting layer 20, by subjecting the second area Pb to ultrasonic welding, the insulator sheet 11 and the first bonding restricting layer 20 are bonded and the first bonding restricting layer 20 and the coated core wire part 32 are bonded. A processing condition for ultrasonic welding in the second bonding part 62 is different from a processing condition for ultrasonic welding in the first bonding part 61. While a processing condition in the first bonding part 61 is that welding of the exposed core wire part 31 is enabled, a processing condition in the second bonding part 62 is that the core wire 30a of the coated core wire part 32 is not to be welded.

The second bonding restricting layer 40 is disposed between the terminal area 11b of the insulator sheet 11 and the second electrode terminal 13b of the second electrode sheet 13 and restricts the bonding between the insulator sheet 11 and the second electrode sheet 13. The second bonding restricting layer 40 is configured substantially in the same manner as the first bonding restricting layer 20. Like the first bonding restricting layer 20, the second bonding restricting layer 40 includes an inner part 41 and an edge 42.

The second lead 50 includes a core wire 50a and a coating 50b that insulatingly coats an outer peripheral surface of the core wire 50a. The second lead 50 includes, on a tip side of the second lead 50, an exposed core wire part 51 from which the coating 50b has been removed and the core wire 50a is exposed. The second lead 50 includes a coated core wire part 52 from which the coating 50b has not been removed. The second lead 50 is configured substantially in the same manner as the first lead 30.

In the transducer 1a, a first bonding part 71 that electrically bonds the second electrode sheet 13 with the exposed core wire part 51 of the second lead 50 is provided in a first area Pc, and a second bonding part 72 that bonds the insulator sheet 11 with the coated core wire part 52 of the second lead 50 is provided in a second area Pd. The first bonding part 71 and the second bonding part 72 are substantially the same as the first bonding part 61 and the second bonding part 62 described above. The first area Pc and the second area Pd are substantially the same as the first area Pa and the second area Pb described above.

3. Effects of Transducer 1a of First Example

According to the transducer 1a of the first example, while the first bonding part 61 in the first area Pa electrically bonds the first electrode sheet 12 with the core wire 30a in the exposed core wire part 31 of the first lead 30, the second bonding part 62 in the second area Pb bonds the insulator sheet 11 with the coating 30b in the coated core wire part 32 of the first lead 30. That is, pull-out resistance of the first lead 30 mainly functions in the second bonding part 62 in the second area Pb.

In this way, by setting a portion where the first electrode sheet 12 and the core wire 30a of the first lead 30 are electrically bonded and a portion where the pull-out resistance of the first lead 30 is secured as separate portions, electrical bonding and pull-out resistance can both be achieved. Accordingly, the core wire 30a of the first lead 30 can be reliably electrically bonded to the first electrode sheet 12, and the pull-out resistance of the first lead 30 can be increased.

By setting different ultrasonic welding processing conditions in the first area Pa and the second area Pb, electrical bonding can be performed in the first area Pa and bonding for securing the pull-out resistance can be performed in the second area Pb.

The first lead 30 is disposed between the insulator sheet 11 and the first electrode sheet 12. That is, with the first lead 30 inserted into a bag-shaped portion formed by the insulator sheet 11 and the first electrode sheet 12, the first lead 30 is bonded to the first electrode sheet 12 and the insulator sheet 11. Accordingly, the first lead 30 can be easily positioned in a desired position and can be reliably bonded. By providing the first bonding restricting layer 20, the abovementioned bag-shaped portion can be easily formed between the insulator sheet 11 and the first electrode sheet 12.

4. First Bonding Restricting Layer 20

4-1. First Bonding Restricting Layer 20 of First Example

As described above, the first bonding restricting layer 20 of the first example that constitutes the transducer 1a is a planar sheet. The first bonding restricting layer 20 includes the inner part 21 and the edge 22.

4-2. First Bonding Restricting Layer 20 of Second Example

Figure 3:
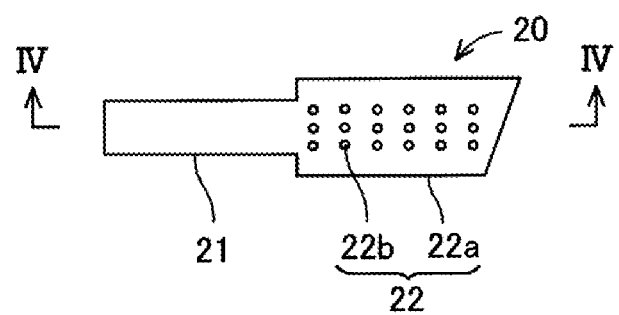
FIG. 3 is a plan view of a bonding restricting layer of a second example that constitutes the electrostatic transducer of the first example.
Figure 4:
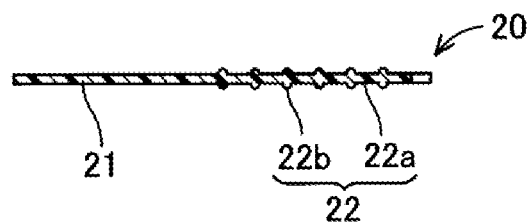
FIG. 4 is a cross-sectional view taken along line IV-IV of FIG. 3.

The first bonding restricting layer 20 of a second example is described with reference to FIG. 3 and FIG. 4. The first bonding restricting layer 20 of the second example includes the inner part 21 and the edge 22. The edge 22 includes a sheet body 22a and a plurality of protrusions 22b. Like the inner part 21 and the edge 22 of the first bonding restricting layer 20 of the first example, the inner part 21 and the sheet body 22a of the edge 22 are planar sheets.

The plurality of protrusions 22b are provided on a first surface and a second surface of the sheet body 22a of the edge 22 and protrude in a plane normal direction. The plurality of protrusions 22b provided on the first surface of the sheet body 22a engage with the coating 30b of the first lead 30 in the plane direction of the sheet body 22a. The plurality of protrusions 22b provided on the second surface of the sheet body 22a engage with the insulator sheet 11 in the plane direction of the sheet body 22a. That is, the second bonding part 62 includes an engagement portion between the protrusions 22b and the insulator sheet 11, and an engagement portion between the protrusions 22b and the coating 30b of the first lead 30.

Accordingly, the insulator sheet 11 and the first bonding restricting layer 20 have a relatively strong bonding force. Further, the coating 30b in the coated core wire part 32 of the first lead 30 and the first bonding restricting layer 20 have a relatively strong bonding force. That is, the pull-out resistance can further be increased.

4-3. First Bonding Restricting Layer 20 of Third Example

Figure 5:
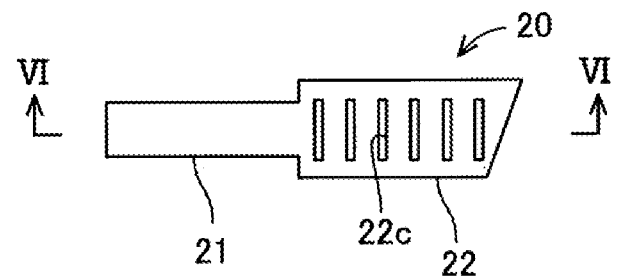
FIG. 5 is a plan view of a bonding restricting layer of a third example that constitutes the electrostatic transducer of the first example.
Figure 6:
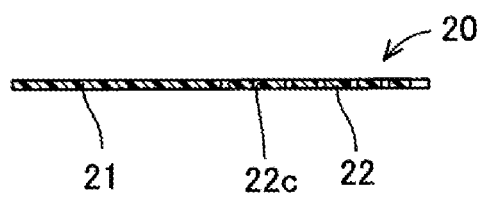
FIG. 6 is a cross-sectional view taken along line VI-VI of FIG. 5.

The first bonding restricting layer 20 of a third example is described with reference to FIG. 5 and FIG. 6. The first bonding restricting layer 20 of the third example includes the inner part 21 and the edge 22. The edge 22 includes a plurality of slits 22c passing therethrough.

Accordingly, by passing at least one of the insulator sheet 11 and the coating 30b in the coated core wire part 32 of the first lead 30 through the slits 22c, the insulator sheet 11 and the coating 30b of the first lead 30 are directly bonded. That is, the second bonding part 62 is configured to include a portion where the insulator sheet 11 and the coating 30b of the first lead 30 are directly bonded in the slits 22c.

Accordingly, through the slits 22c, the insulator sheet 11 and the coating 30b in the coated core wire part 32 of the first lead 30 have a relatively strong bonding force. Further, the portion where the insulator sheet 11 and the coating 30b of the first lead 30 are directly bonded in the slits 22c engages with the slits 22c. Accordingly, the pull-out resistance can further be increased.

5. Transducer 1b of Second Example

Figure 7:
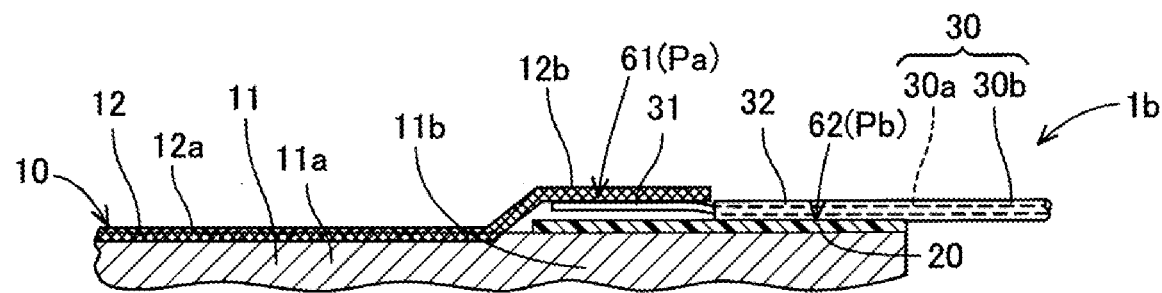
FIG. 7 is a cross-sectional view of an electrostatic transducer of a second example.

A transducer 1b of a second example is described with reference to FIG. 7. As shown in FIG. 7, in the transducer 1b, the first electrode sheet 12 is disposed in an area corresponding to the first area Pa while not disposed in an area corresponding to the second area Pb. Even in such a configuration, the same effects are achieved.

6. Transducer 1c of Third Example

Figure 8:
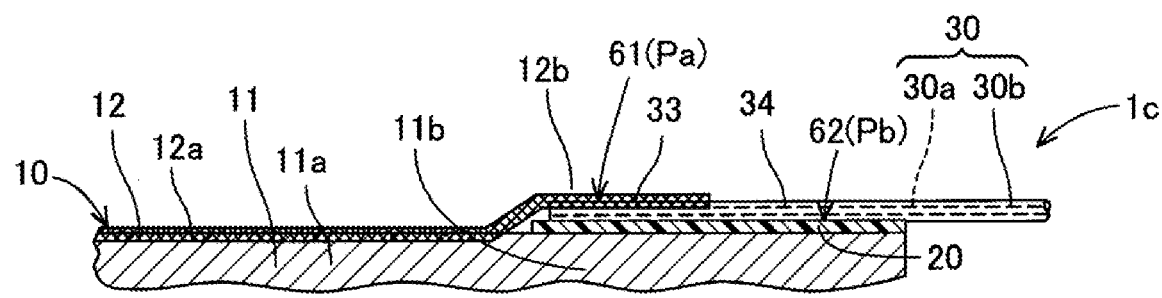
FIG. 8 is a cross-sectional view of an electrostatic transducer of a third example.

A transducer 1c of a third example is described with reference to FIG. 8. As shown in FIG. 8, in the transducer 1c, the first lead 30 does not have a portion where the core wire 30a is exposed. The first lead 30 includes a core wire bonding part 33 on a tip side and a coating bonding part 34 on a base end side. The core bonding part 33 corresponds to the exposed core wire part 31 in the above examples, and the coating bonding part 34 corresponds to the coated core wire part 32 in the above examples.

In the first bonding part 61, the first electrode sheet 12 and the core wire 30a in the core wire bonding part 33 are electrically bonded by ultrasonic welding. That is, in the core wire bonding part 33, by melting of the coating 30*b* by ultrasonic waves, the first electrode sheet 12 and the core wire 30*a* are bonded. The second bonding part 62 bonds the coating 30*b* in the coating bonding part 34 with the insulator sheet 11 by ultrasonic welding. Even in such a configuration, the same effects are achieved.

7. Transducer 1*d* of Fourth Example

Figure 9:
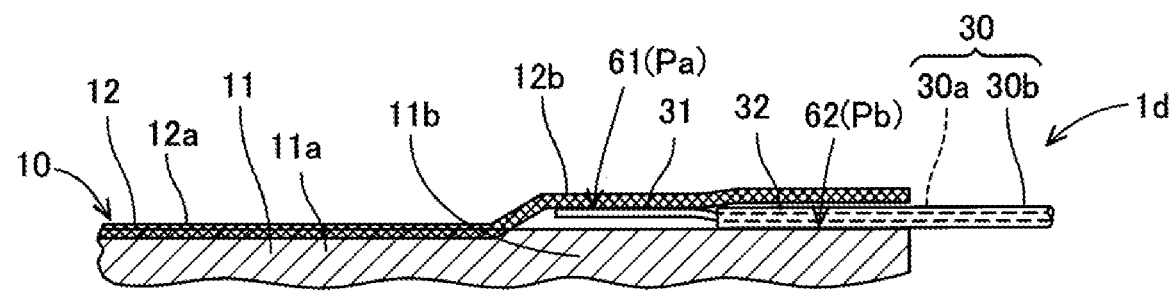
FIG. 9 is a cross-sectional view of an electrostatic transducer of a fourth example.

A transducer 1*d* of a fourth example is described with reference to FIG. 9. In contrast with the transducer 1*a* of the first example, the transducer 1*d* of the fourth example is configured not to include the first bonding restricting layer 20. In this case, the coating 30*b* of the coated core wire part 32 of the first lead 30 is directly bonded to the insulator sheet 11. In the present example, after an area in the first electrode sheet 12 other than where the first lead 30 is disposed has been bonded to the insulator sheet 11, the first electrode sheet 12 and the core wire 30*a* of the first lead 30 may be bonded in the first area Pa, and the insulator sheet 11 and the coating 30*b* of the first lead 30 may be bonded in the second area Pb.

In addition, in a state in which the first electrode sheet 12 and the first lead 30 are disposed on the first surface of the insulator sheet 11, the first electrode sheet 12 and the insulator sheet 11 can be welded, the first electrode sheet 12 and the core wire 30*a* of the first lead 30 can be welded by ultrasonic welding in the first area Pa, and the insulator sheet 11 and the coating 30*b* of the first lead 30 can be welded by ultrasonic welding in the second area Pb. Even in such a configuration, the same effects are achieved.

8. Transducer 1*e* of Fifth Example

Figure 10:
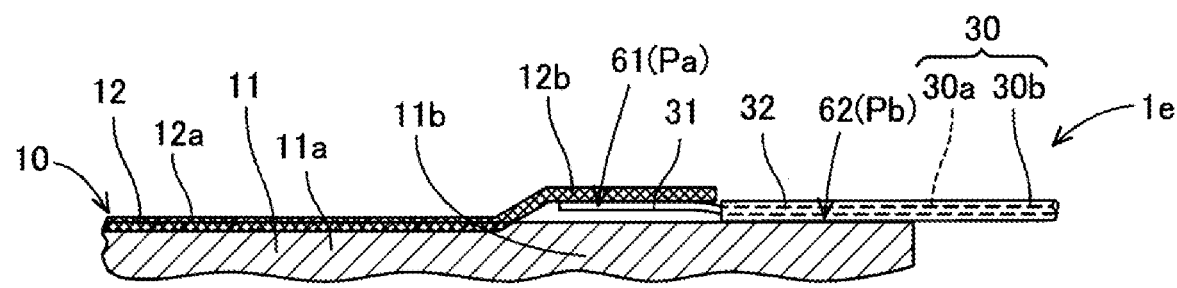
FIG. 10 is a cross-sectional view of an electrostatic transducer of a fifth example.

A transducer 1*e* of a fifth example is described with reference to FIG. 10. As shown in FIG. 10, the transducer 1*e* of the fifth example differs from the transducer 1*d* of the fourth example in that the first electrode sheet 12 is disposed in an area corresponding to the first area Pa while not disposed in an area corresponding to the second area Pb. Even in such a configuration, the same effects are achieved.

9. Transducer 1*f* of Sixth Example

Figure 11:
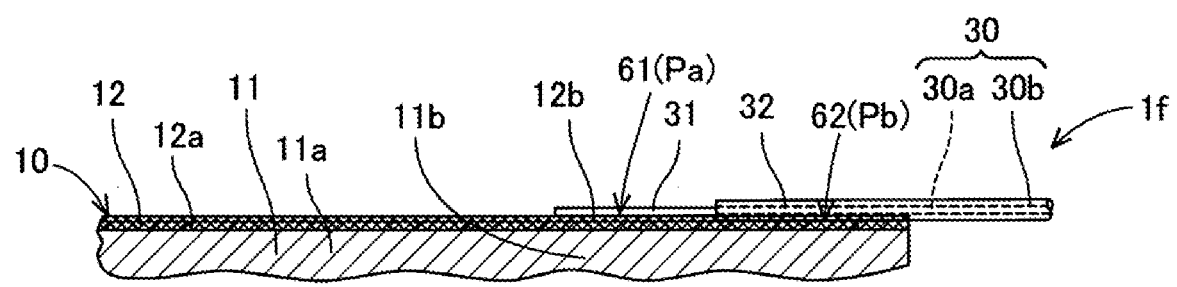
FIG. 11 is a cross-sectional view of an electrostatic transducer of a sixth example.

A transducer 1*f* of a sixth example is described with reference to FIG. 11. In the transducer 1*f* of the sixth example, the first electrode sheet 12 is disposed on the front surface of the insulator sheet 11, and the first lead 30 is disposed on a surface of the first electrode sheet 12 opposite the insulator sheet 11. That is, the first electrode sheet 12 is disposed between the insulator sheet 11 and the first lead 30.

In the present example, in the first area Pa, the core wire 30*a* of the exposed core wire part 31 of the first lead 30 is bonded to the first electrode sheet 12, and the first bonding part 61 is formed. In the second area Pb, the coating 30*b* of the coated core wire part 32 of the first lead 30 is bonded to the insulator sheet 11, and the second bonding part 62 is formed. Here, the coating 30*b* of the coated core wire part 32 of the first lead 30 is bonded through a through hole of the first electrode sheet 12. In this case as well, the same effects are achieved.

10. Transducer 1*g* of Seventh Example

Figure 12:
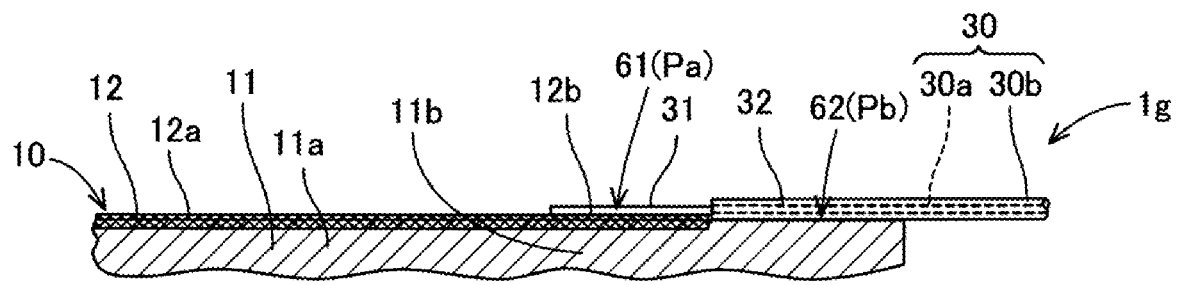
FIG. 12 is a cross-sectional view of an electrostatic transducer of a seventh example.

A transducer 1*g* of a seventh example is described with reference to FIG. 12. In contrast with the transducer 1*f* of the sixth example, in the transducer 1*g* of the seventh example, the first electrode sheet 12 is disposed in an area corresponding to the first area Pa while not disposed in an area corresponding to the second area Pb. Even in such a configuration, the same effects are achieved.

11. Transducer 1*h* of Eighth Example

Figure 13:
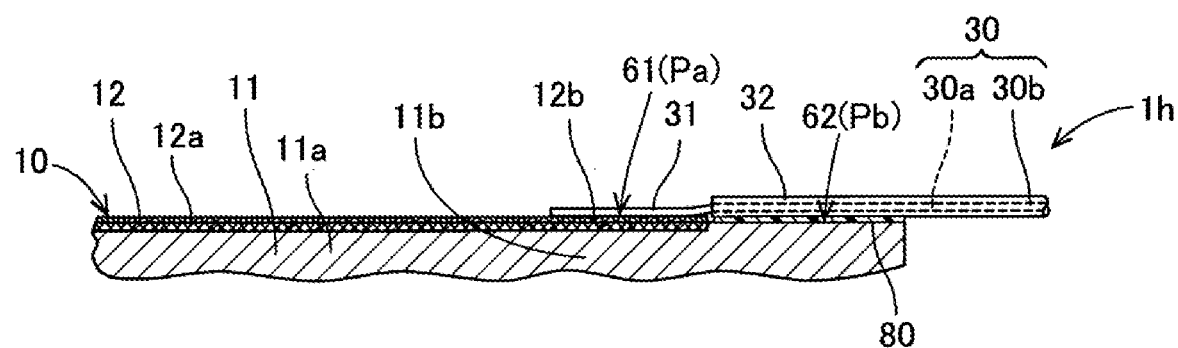
FIG. 13 is a cross-sectional view of an electrostatic transducer of an eighth example.

A transducer 1*h* of an eighth example is described with reference to FIG. 13. In contrast with the transducer 1*g* of the seventh example, in the transducer 1*h* of the eighth example, a bonding assisting layer 80 is provided between the insulator sheet 11 and the coating 30*b* in the coated core wire part 32 of the first lead 30 in the second area Pb. The bonding assisting layer 80 is formed of a thermoplastic material and acts to adjust a height difference of the first electrode sheet 12. If the bonding assisting layer 80 is not present, there is a risk that the first lead 30 may be buried in the insulator sheet 11 due to ultrasonic welding in the second area Pb. In contrast, due to the presence of the bonding assisting layer 80, the height of the first lead 30 can be adjusted in the first area Pa and the second area Pb. Accordingly, a bonding state of the first lead 30 can be made stable.

12. Transducer 1*i* of Ninth Example

Figure 14:
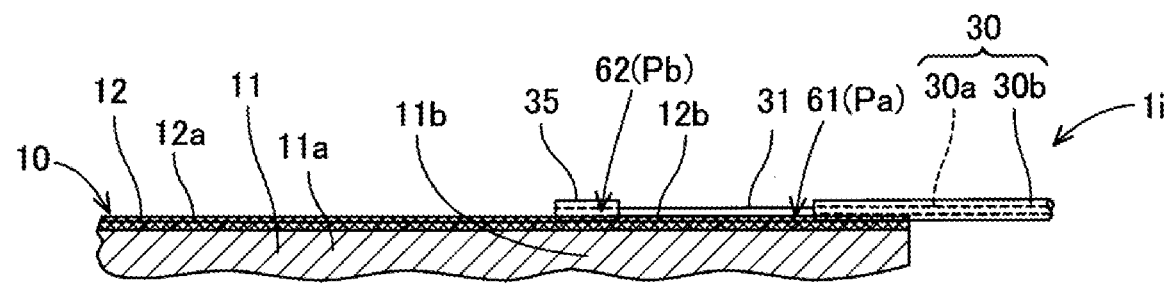
FIG. 14 is a cross-sectional view of an electrostatic transducer of a ninth example.

A transducer 1*i* of a ninth example is described with reference to FIG. 14. In the transducer 1*i* of the ninth example, the first lead 30 includes a coated tip part 35 coated with the coating 30*b* on the tip side of the exposed core wire part 31.

In the first area Pa, by bonding the exposed core wire part 31 to the first electrode sheet 12, the first bonding part 61 is formed. In the second area Pb, by bonding the coated tip part 35 to the insulator sheet 11, the second bonding part 62 is formed. Even in such a configuration, the same effects are achieved. In the present example, the coating 30*b* located on the base end side of the exposed core wire part 31 in the first lead 30 may further be bonded to the insulator sheet 11 and the second bonding part 62 may further be formed. In this case, the second bonding part 62 is formed in two places.

13. Transducer 1*j* of Tenth Example

Figure 15:
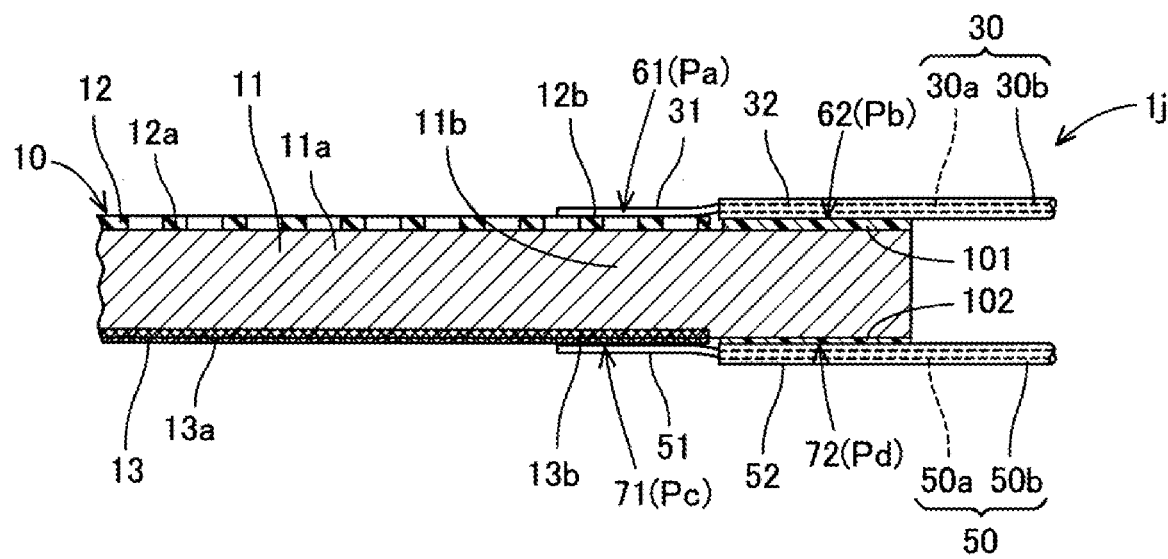
FIG. 15 is a cross-sectional view of an electrostatic transducer of a tenth example.

A transducer 1*j* of a tenth example is described with reference to FIG. 15. In contrast with the transducer 1*h* of the eighth example, in the transducer 1*j* of the tenth example, the first electrode sheet 12 has a plurality of through holes and is formed of a thermoplastic elastomer containing a conductive filler. The second electrode sheet 13 is formed of a conductive cloth.

The through holes in the first electrode sheet 12 are larger than through holes in the second electrode sheet 13. Accordingly, electrical resistivity of the second electrode sheet 13 is less than electrical resistivity of the first electrode sheet 12. Here, since the second electrode sheet 13 functions as a shield electrode, shielding performance can be improved due to low electrical resistivity. On the other hand, in the first electrode sheet 12, the capacitance can be reduced by increasing the electrical resistivity.

Here, since the first electrode sheet 12 is formed of a thermoplastic elastomer having through holes, an electrode sheet having large electrical resistivity can be easily formed. The second electrode sheet 13 may be formed of a thermoplastic elastomer containing a conductive filler, and may be formed in a shape in which the area of the through holes is smaller than that of the first electrode sheet 12.

In the transducer 1*j* of the tenth example, a bonding assisting layer 101 is disposed between the coating 30*b* of the first lead 30 and the insulator sheet 11, and a bonding assisting layer 102 is disposed between the coating 50*b* of the second lead 50 and the insulator sheet 11. The bonding assisting layers 101 and 102 play the same role as the bonding assisting layer 80 in the transducer 1*h* of the eighth example.

What is claimed is:

1. An electrostatic transducer, comprising:
   an insulator sheet;
   a first electrode sheet, disposed on a first surface of the insulator sheet;
   a lead, comprising a core wire and a coating formed of a thermoplastic material and coating the core wire, the lead having a portion disposed overlapping the first surface of the insulator sheet and a portion disposed overlapping the first electrode sheet;
   a first bonding part, electrically bonding the first electrode sheet with the core wire of the lead in a first area in a plane direction of the insulator sheet, wherein the first electrode sheet and the core wire of the lead are disposed overlapping each other in the first area; and
   a second bonding part, bonding the insulator sheet with the coating of the lead in a second area in the plane direction of the insulator sheet that is different from the first area, wherein the insulator sheet and the coating of the lead are disposed overlapping each other in the second area.

2. The electrostatic transducer according to claim 1, wherein
   the insulator sheet is formed of a thermoplastic material; and
   the second bonding part is composed of a part of the insulator sheet.

3. The electrostatic transducer according to claim 2, wherein
   the insulator sheet is formed of a thermoplastic elastomer.

4. The electrostatic transducer according to claim 1, wherein
   the lead comprises an exposed core wire part on a tip side of the lead from which the coating has been removed and the core wire is exposed; and
   the first bonding part electrically bonds the first electrode sheet with the exposed core wire part of the lead.

5. The electrostatic transducer according to claim 4, wherein
   in the exposed core wire part, a metal plating layer is formed on the core wire; and
   the first bonding part is composed of a part of the metal plating layer.

6. The electrostatic transducer according to claim 5, wherein
   the core wire is a copper wire; and
   the metal plating layer is nickel plating.

7. The electrostatic transducer according to claim 4, wherein
   in the exposed core wire part, a solder flow layer is formed on the core wire; and
   the first bonding part is composed of a part of the solder flow layer.

8. The electrostatic transducer according to claim 1, further comprising:
   a bonding restricting layer, disposed between the insulator sheet and the first electrode sheet in the first area and restricting bonding between the insulator sheet and the first electrode sheet.

9. The electrostatic transducer according to claim 8, wherein
   in the second area a part of the bonding restricting layer is disposed between the insulator sheet and the coating of the lead; and
   the second bonding part is composed of the part of the bonding restricting layer, a part of the insulator sheet, and a part of the coating of the lead.

10. The electrostatic transducer according to claim 9, wherein
    the bonding restricting layer comprises:
    a sheet body; and
    a plurality of protrusions, provided on a first surface of the sheet body and engaging with the coating of the lead in the plane direction of the sheet body.

11. The electrostatic transducer according to claim 9, wherein
    the bonding restricting layer comprises a plurality of slits passing therethrough; and
    the second bonding part is configured in which the insulator sheet and the coating of the lead are directly bonded by passing at least one of the insulator sheet and the coating of the lead through the plurality of slits.

12. The electrostatic transducer according to claim 8, wherein
    the bonding restricting layer is formed of a material having a softening point higher than a softening point of the insulator sheet.

13. The electrostatic transducer according to claim 12, wherein
    the bonding restricting layer is a resin sheet formed of a thermoplastic material.

14. The electrostatic transducer according to claim 8, wherein
    the bonding restricting layer is formed in an elongated shape and has one end in a lengthwise direction disposed on an end side of the first electrode sheet.

15. The electrostatic transducer according to claim 14, wherein
    the bonding restricting layer is formed so that the other end in the lengthwise direction is narrower than the one end in the lengthwise direction.

16. The electrostatic transducer according to claim 1, wherein
    the first electrode sheet is disposed in an area corresponding to the first area, and is not disposed in an area corresponding to the second area.

17. The electrostatic transducer according to claim 16, wherein
    the lead is disposed between the insulator sheet and the first electrode sheet.

18. The electrostatic transducer according to claim 16, wherein
    the first electrode sheet is disposed between the insulator sheet and the lead.

19. The electrostatic transducer according to claim 18, further comprising:
    in the second area, a bonding assisting layer formed of a thermoplastic material and disposed between the insulator sheet and the coating of the lead, wherein
    the second bonding part is composed of a part of the bonding assisting layer.

20. The electrostatic transducer according to claim 1, wherein
    the first electrode sheet has a plurality of through holes.

21. The electrostatic transducer according to claim 20, wherein
the first electrode sheet is formed of a conductive cloth.

22. The electrostatic transducer according to claim 20, wherein
the first electrode sheet is formed of a thermoplastic elastomer containing a conductive filler; and
the first bonding part is composed of a part of the first electrode sheet.

23. The electrostatic transducer according to claim 1, wherein
the first bonding part is a portion where the first electrode sheet and the core wire of the lead are bonded by ultrasonic welding.

24. The electrostatic transducer according to claim 23, wherein
the second bonding part is a portion where the insulator sheet and the coating of the lead are bonded by ultrasonic welding.

25. The electrostatic transducer according to claim 1, further comprising:
a second electrode sheet as a shield electrode, disposed on a second surface of the insulator sheet, wherein
electrical resistivity of the second electrode sheet is lower than electrical resistivity of the first electrode sheet.

26. The electrostatic transducer according to claim 25, wherein
the first electrode sheet is formed of a thermoplastic elastomer containing a conductive filler; and
the second electrode sheet is formed of a conductive cloth.

27. The electrostatic transducer according to claim 25, wherein
the first electrode sheet and the second electrode sheet are formed of a thermoplastic elastomer containing a conductive filler.

* * * * *